(12) United States Patent
Tang

(10) Patent No.: US 8,464,044 B2
(45) Date of Patent: Jun. 11, 2013

(54) WIRELESS NETWORK PROBE SYSTEM AND METHOD

(75) Inventor: Cheng-Wen Tang, Taipei Hsien (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 705 days.

(21) Appl. No.: 12/686,581

(22) Filed: Jan. 13, 2010

(65) Prior Publication Data

US 2011/0069832 A1 Mar. 24, 2011

(30) Foreign Application Priority Data

Sep. 21, 2009 (CN) .......................... 2009 1 0307365

(51) Int. Cl.
*H04L 29/06* (2006.01)

(52) U.S. Cl.
USPC ................. 713/153; 713/154; 726/2; 726/23; 709/224; 455/410

(58) Field of Classification Search
USPC .. 726/2, 23; 709/224; 713/153, 154; 455/410
See application file for complete search history.

(56) References Cited

U.S. PATENT DOCUMENTS 7,333,800 B1 * 2/2008 Gopinath ...................... 455/411

OTHER PUBLICATIONS

Stephen Glass et al., : "A Study of the TKIP Cryptographic DOS Attack", IEEE, Dec. 2007, pp. 59-65.*
Robert Vamosi: "The Anatomy of a Wireless man in the Middle Attack", CNET Security Watch, CNET Reviews, Sep. 5, 2012.*

* cited by examiner

*Primary Examiner* — Eleni Shiferaw
*Assistant Examiner* — Paul Callahan
(74) *Attorney, Agent, or Firm* — Altis Law Group, Inc.

(57) ABSTRACT

A wireless network probe method intercepts a data packet sent from a certain station, which has established communication with an access point (AP) connected to a wireless network before a service set identifier (SSID) of the wireless network has been closed. The method further amends data in the data packet to generate two attacked data packets, transmits the two attacked data packets using a media control access (MAC) address of the certain station, to interrupt the communication between the AP and the certain station. Furthermore, the method intercepts a re-association data packet sent to the AP from the certain station, retrieves the SSID from the re-association data packet, and stores the SSID into a second station, so as to connect the second station to the wireless network.

10 Claims, 3 Drawing Sheets

WIRELESS NETWORK PROBE SYSTEM AND METHOD

BACKGROUND

1. Technical Field

Embodiments of the present disclosure relates to wireless communication methods, and more particularly, to a wireless network probe system and method.

2. Description of Related Art

Stations are basic devices in wireless networks. An access point (AP) can let the stations access a wireless network to which the AP is directly connected. A service set identifier (SSID), which is often broadcast by APs connected to the wireless network, shows the name of the wireless network. It is necessary for a station to know the SSID in order to connect to the wireless network. If the wireless network closes its SSID, that is, data packets broadcast by the AP hide the SSID of the wireless network, the stations that do not know the SSID cannot be connected to the wireless network.

What is needed, therefore, is an improved method to overcome the aforementioned problem.

DETAILED DESCRIPTION

The disclosure is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used hereinafter, refers to logic embodied in hardware or firmware, or to a collection of software instructions, written in a programming language, such as, for example, Java, C, or assembly. One or more software instructions in the modules may be embedded in firmware. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
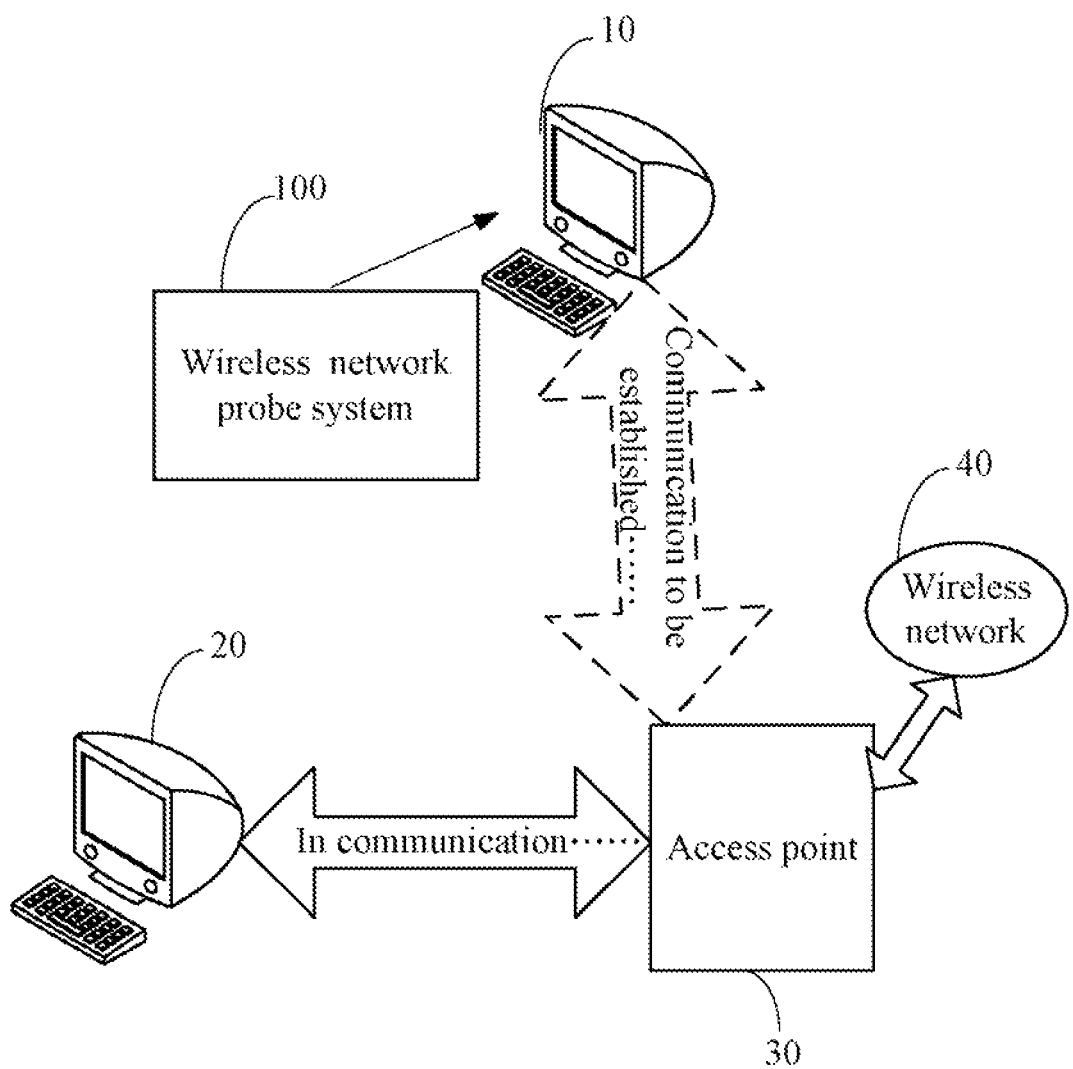
FIG. 1 is a block diagram of one embodiment of an application environment of a wireless network probe system.

FIG. 1 is a block diagram of one embodiment of an application environment of a wireless network probe system 100. The system 100 may be installed in stations, such as a first station 10 to probe a wireless network 40 that has a closed service set identifier (SSID). In one embodiment, the first station 10 is a computer or a set of computers. An access point (AP) 30 is connected to the wireless network 40. The AP 30 may be a stand-alone device that plugs into an Ethernet switch or a hub for transmitting and receiving data. The AP 30 may automatically broadcast a beacon packet at regular intervals (e.g., ten times a second), to inform all stations covered by the wireless network 40 of the existence of the wireless network 40. In another way, the first station 10 may broadcast a probe request packet for getting the SSID of the wireless network 40. In the latter case, after receiving the probe request packet, the AP 30 unicasts a probe response packet to the first station 10. However, due to that the SSID of the wireless network 40 has been closed, the beacon packet and the probe response packet hide the SSID of the wireless network 40.

Figure 2:
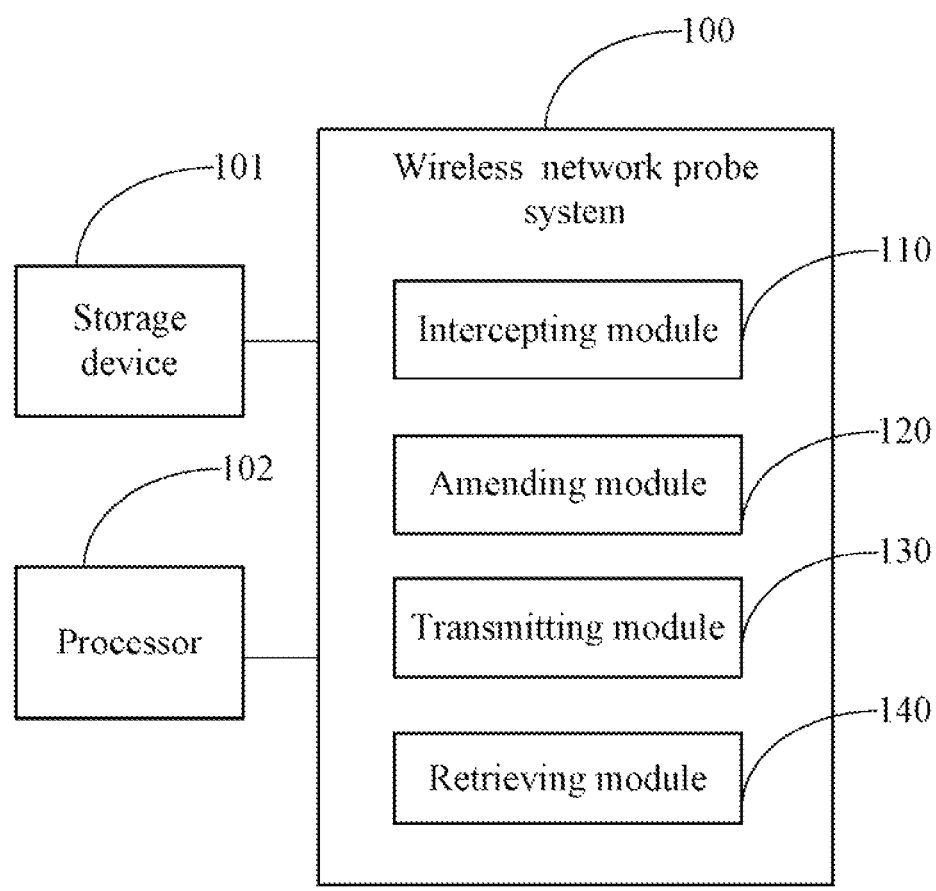
FIG. 2 is a block diagram of one embodiment of function modules of the wireless network probe system in FIG. 1.

As shown in FIG. 2, the wireless network probe system 100 includes an intercepting module 110, an amending module 120, a transmitting module 130, and a retrieving module 140. Computerized codes of the modules 110-140 are stored in a storage device 101 of the station 10, where a processor 102 executes the computerized codes, to provide one or more operations of the service network probe system 100, so as to probe the SSID of the wireless network 40 to establish a connection between the first station 10 and the wireless network 40. Depending on the embodiment, the storage device 101 may be a smart media card, a secure digital card, or a compact flash card.

The intercepting module 110 intercepts an encrypted data packet sent to the AP 30 from the second station 20, which has already established communication with the AP 30. In one embodiment, the encrypted data packet is a temporal key integrity protocol (TKIP) data packet. It may be understood that, in wireless networks, each TKIP data packet sent by the second station 20 has a unique encryption key allocated by the AP 30 to encrypt message in the data packet, and each TKIP data packet uses a message integrity code (MIC) that is based on the Michael algorithm to protect against message tampering. After receiving a TKIP data packet, the AP 30 compares a MIC value embedded in the TKIP data packet (calculated by the second station 20) with a MIC value calculated by the AP 30, so as to determine if the TKIP data packet has been attacked. Generally, if a first attacked TKIP data packet is received, the AP 30 will reply with a report to inform the second station 20 of an error occurrence. If a second attacked TKIP data packet is received in a time period (such as 60 seconds), the AP 30 will close communication between the AP 30 and all stations (including the second station 20) currently in communication with the AP 30, and reallocate encryption keys for all the communication stations.

The amending module 120 amends data in the encrypted data packet, in order to generate two attacked data packets. For example, the amending module 120 changes a binary digit 0 to 1 in the encrypted data packet to generate a first attacked data packet A, and changes a binary digit 1 to 0 in the encrypted data packet to generate a second attacked data packet B.

The transmitting module 130 transmits the two attacked data packets to the AP 30 using a media control access (MAC) address of the second station 20, which has already established communication with the AP 30, so that the two attacked data packets are accepted by the AP 30 since the MAC address can be identified by the AP 30. The MAC address of the second station 20 is obtained from the encrypted data packet. After receiving the two attacked data packets, the AP 30 decrypts each attacked data packet, calculates a MIC value for message in each attacked data packet, and compares the calculated MIC value with an original MIC value embedded in the attacked data packet. Due to data in the attacked data packet being amended, the calculated MIC value is not identical with the original MIC value. As a result, as mentioned above, the AP 30 will close communication between all stations (including the second station 20) currently in communication with the AP 30.

The intercepting module 110 further intercepts a re-association request data packet sent from the second station 20 to the AP 30, and a re-association response data packet sent from the AP 30 to the second station 20. Due to communication being interrupted, the second station will send a re-association request data packet to the AP 30 for reestablishing contact. After receiving the re-association request data packet, the AP 30 will send a re-association response data packet to the second station 20. Due to the second station 20 and the AP 30 being in communication before the interruption, that is, the second station 20 knows the SSID of the wireless network 40, both the re-association request data packet and the re-association response data packet include information of the SSID of the wireless network 40.

The retrieving module 140 retrieves the SSID of the wireless network 40 from the re-association request data packet or the re-association response data packet, and stores the SSID in the first station 10. As a result, the first station 10 can also be connected to the wireless network 40 with the retrieved SSID.

Figure 3:
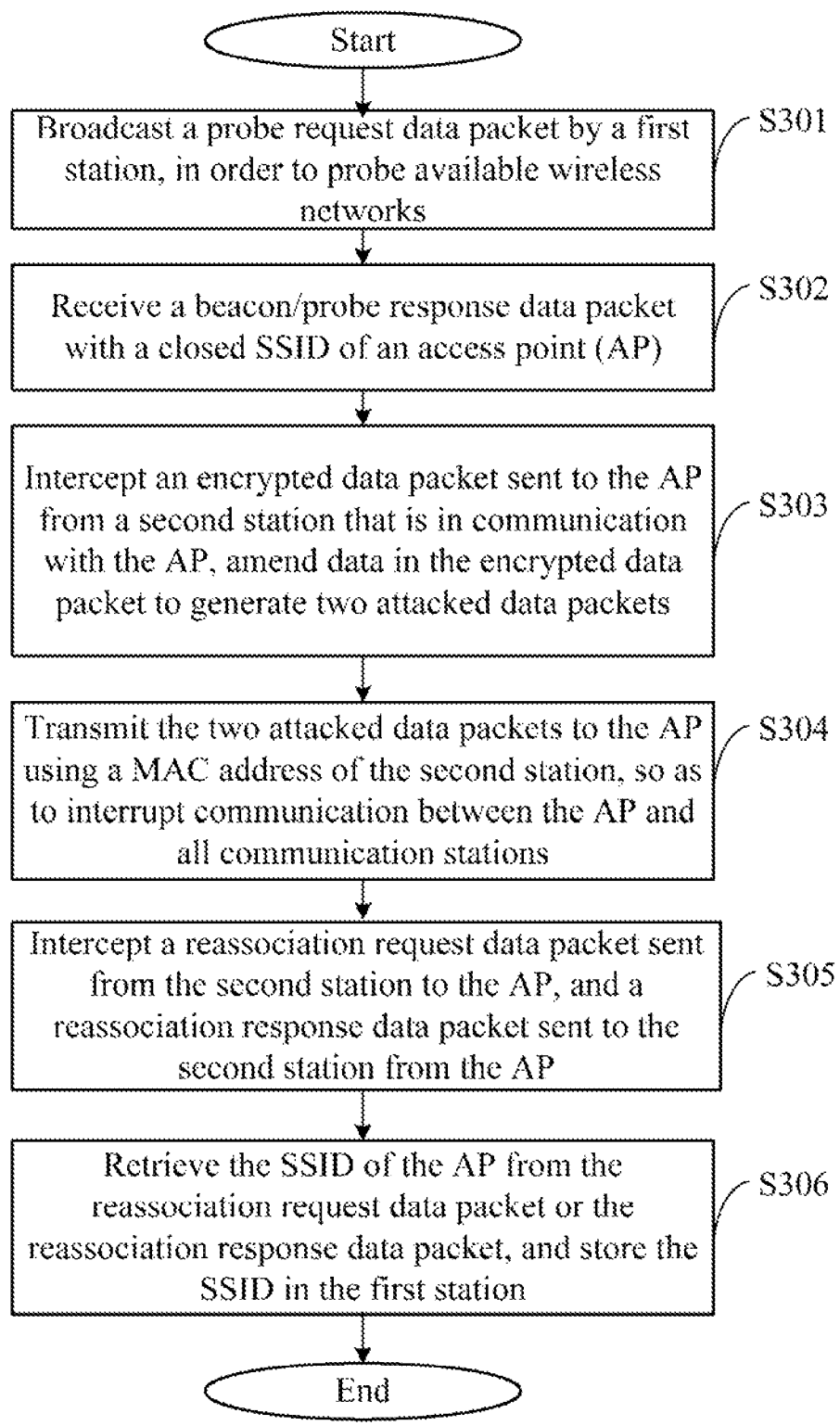
FIG. 3 is a flowchart of one embodiment of a wireless network probe method.

FIG. 3 is a flowchart of one embodiment of a wireless network probe method. Depending on the embodiment, additional blocks may be added, others removed, and the ordering of the blocks may be changed.

In block S301, the first station 10 broadcasts a probe request data packet, to probe available wireless networks. It is understood that, in this embodiment, the second station 20 has established communication with the AP 30 before the SSID of the wireless network 40 has been closed.

In block S302, the first station 10 receives a beacon data packet regularly broadcasted by the AP 30, or receives a probe response data packet unicast by the AP 30 after the AP 30 receiving the probe request data packet. Generally speaking, if the SSID of the wireless network 40 has not been closed, the AP 30 should issue the SSID of the wireless network 40 in the beacon data packet and the probe response data packet. However, due to that the SSID of the wireless network 40 has been closed, SSID information of the wireless network 40 is hidden in the beacon data packet and the probe response data packet.

In block S303, the intercepting module 110 intercepts an encrypted data packet sent to the AP 30 from the second station 20, the amending module 120 generates two attacked data packets by amending data in the encrypted data packet. For example, the amending module 120 generates a first attacked data packet A by changing a binary digit 0 to 1 in the encrypted data packet, and generates a second attacked data packet B by changing a binary digit 1 to 0 in the encrypted data packet. In one embodiment, the encrypted data packet is a TKIP data packet. It may be understood that, each TKIP data packet sent by the second station 20 is only accepted by the AP 30 when a MIC value embedded in the TKIP data packet (calculated by the second station 20) and a MIC value calculated by the AP 30 are identical. If data in the TKIP data packet has been attacked, the two MIC values are different, and the AP 30 will drop the TKIP data packet. If two attacked TKIP data packets are received in a time period (often 60 seconds), the AP 30 will interrupt the communication between the AP 30 and all stations (including the second station 20) currently in communication with the AP 30.

In block S304, the transmitting module 130 transmits the two attacked data packets to the AP 30, in order to interrupt the communication between the AP 30 and any other station. In one embodiment, the two attacked data packets are sent using the MAC address of the second station 20, so that the two attacked data packets are allowed to be accepted by the AP 30 since the MAC address can be identified by the AP 30. After receiving the two attacked data packets that have been attacked, the AP 30 interrupts communication between all stations currently in communication with the AP 30.

In block S305, the intercepting module 110 intercepts a re-association request data packet sent from the second station 20 to the AP 30, and a re-association response data packet sent from the AP 30 to the second station 20. After the communication is interrupted, the second station will send a re-association request data packet to the AP 30 for reestablishing contact, and the AP 30 will send a re-association response data packet to the second station 20. Due to that the second station 20 and the AP 30 had established communication before the interruption, both the re-association request data packet and the re-association response data packet include information of the SSID of the wireless network 40.

In block S306, the retrieving module 140 retrieves the SSID of the wireless network 40 from the re-association request data packet or the re-association response data packet, and stores the SSID in the first station. As a result, the first station 10 can be connected to the wireless network 40 with the retrieved SSID.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A wireless network probe method, comprising:
at a first station, broadcasting a probe request data packet across a network, to probe available wireless networks;
receiving a beacon data packet regularly broadcasted by an access point (AP) that is connected to a wireless network, or receiving a probe response data packet sent by the AP as a reply of receiving the probe request data packet by the first station, wherein a service set identifier (SSID) is hidden in the beacon data packet or the probe response data packet, due to the wireless network closing the SSID;
intercepting an encrypted data packet sent to the AP by a second station, which has established communication with the AP before the wireless network closes the SSID;
amending data in the encrypted data packet to generate two attacked data packets;
transmitting the two attacked data packets to the AP using a media control access address (MAC) of the second station, so that the two attacked data packets are regarded as being sent from the second station, to interrupt communication between the AP and the second station;
intercepting a re-association request data packet sent to the AP from the second station and a re-association response data packet sent to the second station from the AP; and
retrieving the SSID of the wireless network from the re-association request data packet or the re-association response data packet, and storing the SSID in the first station to connect to the wireless network.

2. The method as claimed in claim 1, wherein the encrypted data packet is a temporal key integrity protocol (TKIP) data packet comprising an original message integrity code (MIC) value, and wherein the AP calculates a new MIC value after receiving the TKIP data packet, compares the new MIC value with the original MIC value, and determines the TKIP data packet has been attacked if the new MIC value is not identical with the original MIC value.

3. The method as claimed in claim 1, wherein the AP interrupts communication between the AP and all stations currently in communication with the AP if the AP receives two attacked data packets from a station that is in communication with the AP in a predetermined time period.

4. The method as claimed in claim 3, wherein the predetermined time period is 60 seconds.

5. The method as claimed in claim 1, wherein each of the first station and the second station is a computer or a set of computers.

6. A wireless network probe system for connecting a first station to a wireless network with a closed service set identifier (SSID), comprising:
- a storage device;
- at least one processor; and
- one or more programs stored in the storage device and executed by the at least one processor to perform a wireless network probe method, the method comprising:
- intercepting an encrypted data packet sent to an access point (AP) from a second station after the first station broadcasts a probe request data packet across a network and receives a beacon data packet regularly broadcasted by the AP or a probe response data packet sent by the AP as a reply of receiving the probe request data packet by the first station, wherein: the AP is connected to the wireless network, the SSID is hidden in the received beacon data packet or the received probe response data packet, and the second station has already established communication with the AP before the wireless network closes the SSID;
- amending data in the encrypted data packet to generate two attacked data packets;
- transmitting the two attacked data packets to the AP using a media control access address (MAC) of the second station, so that the two attacked data packets are regarded as being sent from the second station, to interrupt communication between the AP and the second station;
- intercepting a re-association request data packet sent to the AP from the second station and a re-association response data packet sent to the second station from the AP; and
- retrieving the SSID of the wireless network from the re-association request data packet or the re-association response data packet, and storing the SSID in the first station to connect to the wireless network.

7. The system as claimed in claim 6, wherein the encrypted data packet is a temporal key integrity protocol (TKIP) data packet comprising an original message integrity code (MIC) value, and wherein the AP calculates a new MIC value after receiving the TKIP data packet, compares the new MIC value with the original MIC value, and determines the TKIP data packet has been attacked if the new MIC value is not identical with the original MIC value.

8. The system as claimed in claim 6, wherein the AP interrupts communication between the AP and all stations currently in communication with the AP if the AP receives two attacked data packets from a station that is in communication with the AP in a predetermined time period.

9. The system as claimed in claim 8, wherein the predetermined time period is 60 seconds.

10. The system as claimed in claim 6, wherein the storage device is selected from the group consisting of a smart media card, a secure digital card, and a compact flash card.

* * * * *